United States Patent
Tanizoe et al.

(10) Patent No.: US 8,866,835 B2
(45) Date of Patent: Oct. 21, 2014

(54) COLOR ADJUSTMENT SYSTEM FOR DISPLAY DEVICE AND PRINTED MATERIAL

(75) Inventors: Hideki Tanizoe, Tokyo (JP); Hidenori Sakai, Tokyo (JP); Yasuhiro Arakawa, Tokyo (JP); Hiroshi Ueno, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1181 days.

(21) Appl. No.: 12/571,573

(22) Filed: Oct. 1, 2009

(65) Prior Publication Data
US 2010/0020117 A1    Jan. 28, 2010

(30) Foreign Application Priority Data
Feb. 10, 2008   (JP) .................................. 2008-257165

(51) Int. Cl.
*G09G 5/02* (2006.01)
*G09G 5/10* (2006.01)
*G09G 3/36* (2006.01)
*G09G 5/00* (2006.01)
*H04N 1/60* (2006.01)
*H04N 9/73* (2006.01)
*H04N 17/02* (2006.01)

(52) U.S. Cl.
CPC .............. *G09G 5/005* (2013.01); *H04N 1/6077* (2013.01); *H04N 1/6013* (2013.01); *H04N 9/73* (2013.01); *G09G 5/02* (2013.01); *G09G 5/006* (2013.01); *G09G 5/026* (2013.01); *H04N 17/02* (2013.01)
USPC ........... 345/589; 358/504; 358/519; 358/521; 358/527; 358/532; 348/189; 348/184; 348/625; 348/630; 348/71; 345/593; 345/594; 345/690

(58) Field of Classification Search
USPC ......... 345/188, 102, 146, 204, 590, 593, 594, 345/589, 690, 904
See application file for complete search history.

(56) References Cited

U.S. PATENT DOCUMENTS

| | | | | |
|---|---|---|---|---|
| 3,489,849 A | * | 1/1970 | Hedger | 358/406 |
| 5,570,108 A | * | 10/1996 | McLaughlin et al. | 715/823 |
| 5,574,664 A | * | 11/1996 | Feasey | 702/107 |
| 6,657,611 B1 | | 12/2003 | Sterken et al. | |
| 6,686,953 B1 | | 2/2004 | Holmes | |
| 7,317,458 B2 | | 1/2008 | Wada | |
| 2004/0263920 A1 | * | 12/2004 | Kondo et al. | 358/497 |
| 2005/0115425 A1 | | 6/2005 | Plaschka et al. | |
| 2006/0132867 A1 | * | 6/2006 | Sugiyama et al. | 358/504 |
| 2006/0146065 A1 | | 7/2006 | Wada | |

(Continued)

FOREIGN PATENT DOCUMENTS

| | | |
|---|---|---|
| CN | 1605089 A | 4/2005 |
| CN | 1641415 A | 7/2005 |

(Continued)

*Primary Examiner* — Alexander S Beck
*Assistant Examiner* — Nguyen H Truong
(74) *Attorney, Agent, or Firm* — Birch, Stewart, Kolasch & Birch, LLP

(57) ABSTRACT

A color adjustment system for a display device includes a computer device, and a display device for displaying an image. The display device selectably displays a plurality of color temperature color presets. The computer device makes a white point adjustment to the display device, based on a color temperature color preset selected from among the plurality of color temperature color presets by a selecting operation from the computer device.

11 Claims, 15 Drawing Sheets

(56) References Cited

U.S. PATENT DOCUMENTS

| | | | |
|---|---|---|---|
| 2006/0170207 A1* | 8/2006 | Kracke | 283/106 |
| 2006/0176311 A1* | 8/2006 | Kimoto et al. | 345/589 |
| 2006/0289613 A1* | 12/2006 | Rocco | 229/92.8 |
| 2007/0206121 A1* | 9/2007 | Yoshida | 348/630 |
| 2008/0074436 A1 | 3/2008 | Wada | |
| 2008/0158113 A1 | 7/2008 | Ozawa | |
| 2008/0297456 A1* | 12/2008 | Marcu et al. | 345/88 |

FOREIGN PATENT DOCUMENTS

| | | | |
|---|---|---|---|
| CN | 1846448 A | 10/2006 |
| JP | 6-268822 A | 9/1994 |
| JP | 10-285414 A | 10/1998 |
| JP | 11-178015 A | 7/1999 |
| JP | 2000-287221 A | 10/2000 |
| JP | 2001-177846 A | 6/2001 |
| JP | 2002-544572 A | 12/2002 |
| JP | 2005-43176 A | 2/2005 |
| JP | 2005-80239 A | 3/2005 |
| JP | 2005-208982 A | 8/2005 |
| JP | 2007-13663 A | 1/2007 |
| JP | 2007-235506 A | 9/2007 |
| JP | 2008-164766 A | 7/2008 |
| TW | 200829008 A | 7/2008 |

* cited by examiner

F I G . 1
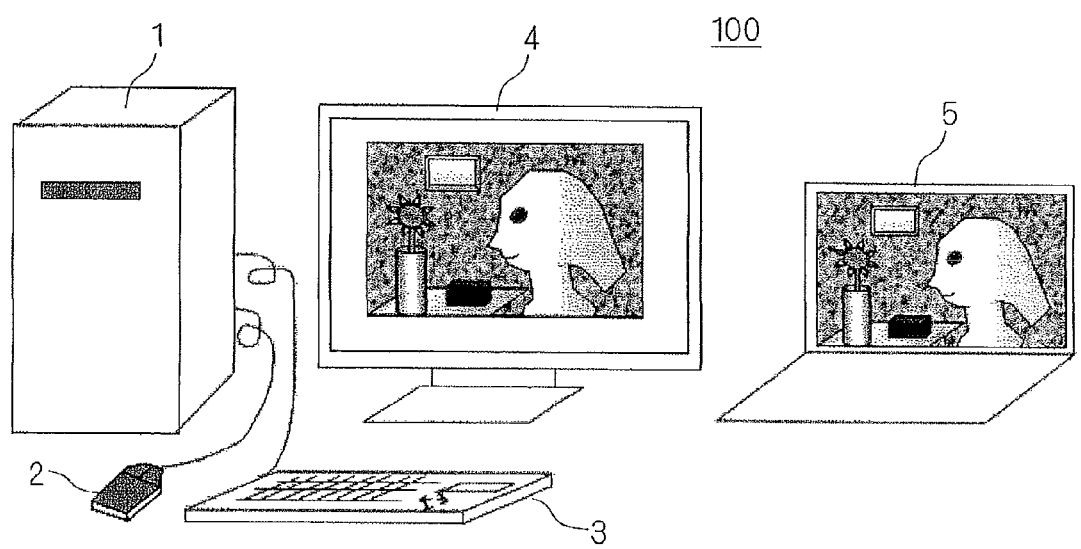

F I G . 3
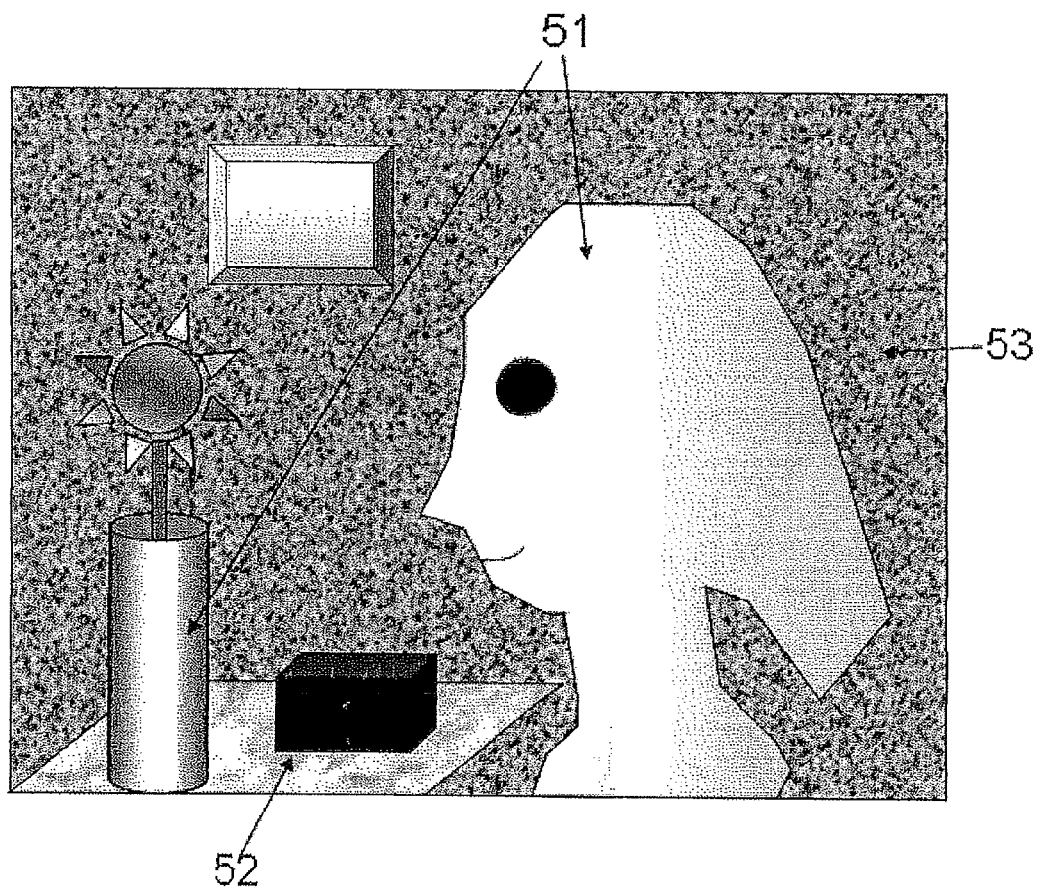

FIG. 10
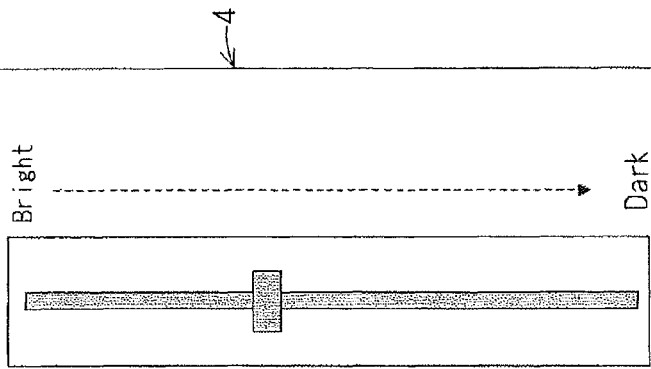
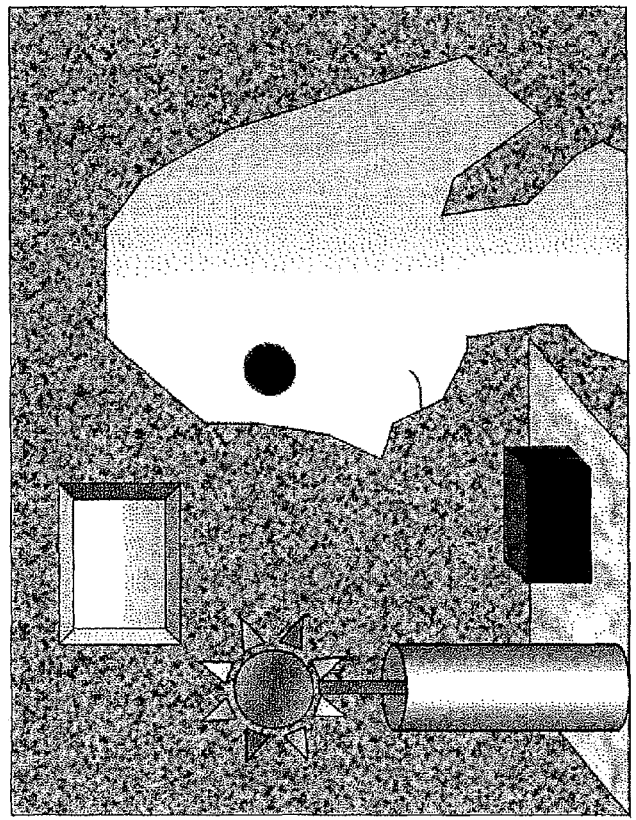

FIG. 12

How to specify the white point

● Adjust on the chromaticity diagram    ○ Specify by selecting an image

[Next]

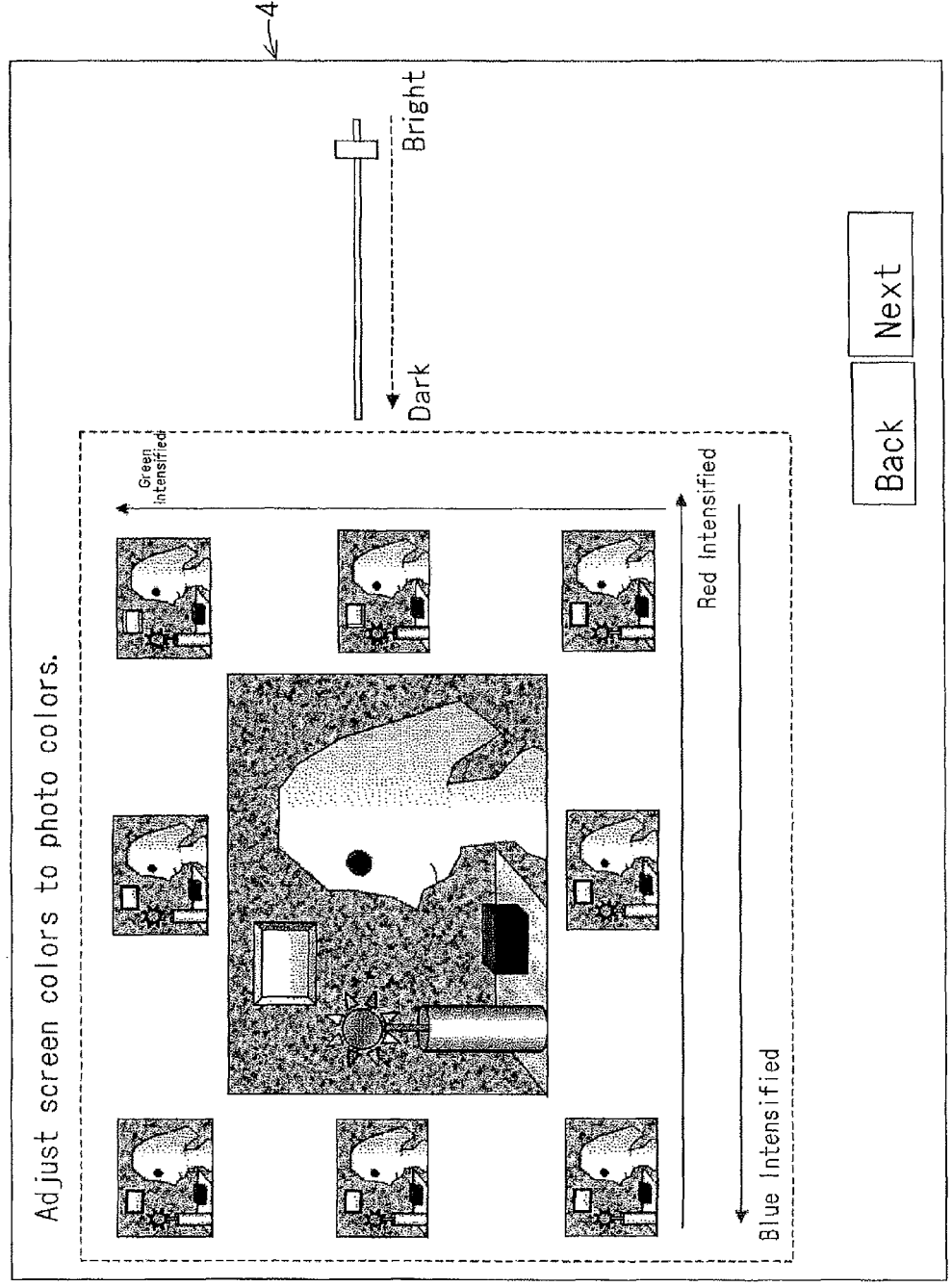

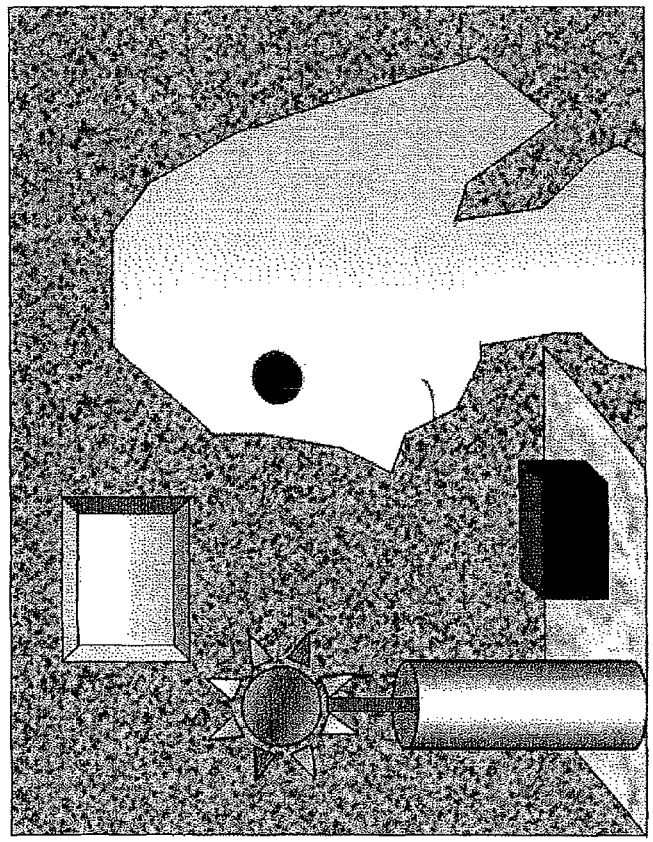

COLOR ADJUSTMENT SYSTEM FOR DISPLAY DEVICE AND PRINTED MATERIAL

BACKGROUND OF THE INVENTION

1. Field of the Invention

The present invention relates to a color adjustment system for a display device, and a printed material for use in white point adjustment using the color adjustment system for the display device.

2. Description of the Background Art

Some conventional display color adjustment systems use a color sensor to adjust and operate a display device by means of a previously set white point (brightness and chromaticity) as a target value. In this case, it is not easy to ensure compatibility between the target values of the brightness and the chromaticity previously set by a user and various conditions unmanageable by the display device alone such as the color temperature of illumination, illuminance, paper color and the like in a visual environment.

In some work environments for business use, the color temperature of illumination, a color rendering index (Ra) and illuminance are previously managed at constant values, and specifications of printing paper are also previously managed. In ordinary households, offices and the like, however, illumination design intended only for color management is difficult, and the above-mentioned problem becomes more difficult.

In the case of a printed material, for example, when the color temperature of illumination is changed to a lower value (reddish light), the color temperature of the white point of the printed material based on the reflected light thereof decreases, and is also influenced by the paper color (paper white) of sheets of the printed material. The arrangement of such relationships provides the following mathematical relationship: (the spectral distribution of observed light)=(the spectral distribution of an illumination light source)×(the spectral reflectance of paper).

On the other hand, when the influence of illumination is eliminated, for example, during display on a liquid crystal display device, the following mathematical relationship is provided: (the spectral distribution of observed light)=(the spectral distribution of a backlight source)×(the spectral transmittance of a liquid crystal panel (including a color filter)).

The spectral distribution of light observed on a printed material and the spectral distribution of light observed on a display device are significantly difference in shape from each other. As a means for color matching between the two images, a method to be described below is used. Specifically, the method used in this case is such that display on different devices is performed so that the colorimetric values for tristimulus values in a CIE-XYZ color space and the like are equal in a certain visual environment. In this manner, the concept of the conventional method of color adjustment of a display device is to make an adjustment, based on previously determined observation conditions (light sources and illuminance), printing paper and printing conditions, toward previously determined target adjustment values in accordance with these conditions.

A problem in making the color adjustment to a display device in the case of the prior art lies in the fact that improvements and the like in the visual environment including illumination are not easily made in ordinary households. Also, a purpose-built color measurement device (a color sensor) is necessary for the color management using the tristimulus values. The color sensor is one factor that increases costs in color management.

In regard to a correlation between the color matching function defined by CIE 1931 and the like and the color perception of the actual human eye, there is not always a match between the color measured by the color matching function and the actual appearance thereof, depending on the shapes of the spectral distributions of two types of light to be compared. Accordingly, there are cases in which two colors having the same XYZ values are seen differently.

To solve the problems mentioned above, there has been devised a system for adjusting the white point of a display device by comparison with a reference object color (as disclosed, for example, in Japanese Patent Application Laid-Open No. 2005-208982). Also, there has been devised another system for adjusting the white point in such a manner that different color patches of a plurality of colors are displayed and a user selects a color patch that he or she feels to be an achromatic color (as disclosed, for example, in Japanese Patent Application Laid-Open No. 11-178015 (1999)).

Each of the systems disclosed in Japanese Patent Application Laid-Open No. 2005-208982 and in Japanese Patent Application Laid-Open No. 11-178015 (1999) is a system using visual adjustments, but makes an adjustment with the hand of a user, with a color patch (a color pattern) displayed. In this case, the user having given skills, for example an expert in color science, is capable of making the adjustment with accuracy. However, many of the users in ordinary households are not experts in color science, and often find difficulty in color matching using the color pattern. In some instances, there is a likelihood that the color adjustment operation itself is diverged.

SUMMARY OF THE INVENTION

It is an object of the present invention to provide a color adjustment system for a display device which enables a user who is not an expert in color science to easily make a white point adjustment with predetermined accuracy.

It is another object of the present invention to provide a printed material which allows a white point adjustment to be made more easily by using the color adjustment system for the display device, which is easy to produce, and which is low in production costs.

According to a first aspect of the present invention, a color adjustment system for a display device includes a computer device, and a display device for displaying an image. The display device selectably displays a plurality of color temperature color presets. The computer device makes a color adjustment to the display device, based on a color temperature color preset selected from among the plurality of color temperature color presets by a selecting operation from the computer device.

By placing the image displayed on the display device and a printed material with the image printed thereon in juxtaposition with each other, a user who is not an expert in color science can make the color adjustment just like performing color matching for photographs that he or she usually treats under an actual work environment, thereby accomplishing the easy and convenient color adjustment with predetermined accuracy. Also, the user can make a comparison between the printed material and the screen of the display device disposed in juxtaposition with the eye under the above-mentioned visual environment to select a color temperature color preset judged to be closer to that on the printed material from among the plurality of color temperature color presets. This allows the white point of the display device to be closer to the white point of paper in a simple way without undergoing a complicated color adjustment process.

According to a second aspect of the present invention, a color adjustment system for a display device includes a computer device, and a display device for displaying an image. The display device displays a chromaticity diagram. The computer device makes a color adjustment to the display device in accordance with an operation performed on the chromaticity diagram from the computer device.

For the color adjustment of the display device under visual inspection, the user can specify a color that becomes a target of the white point change on the chromaticity diagram by the use of a pointing device such as a mouse and the like. This allows the color adjustment of the display device more intuitively and easily.

According to a third aspect of the present invention, a color adjustment system for a display device includes a computer device, and a display device for displaying an image. The display device selectably displays a plurality of selectable images having respective RGB gain values different from each other. The computer device makes a color adjustment to the display device, based on a selectable image selected from among the plurality of selectable images by a selecting operation from the computer device.

Thus, the color adjustment of the display device is achieved by the operation from the computer device.

A fourth aspect of the present invention is intended for a printed material with an image printed thereon, the printed material being for use in making a white point adjustment to a display device. The image on the printed material includes at least a white portion, a shadow portion of an achromatic color continuously changing from white to black, a black portion, and a gray portion. The percentage of the white portion and the shadow portion in the image is greater than 10%. The percentage of the gray portion in the image is greater than 30%. The percentage of the black portion in the image is greater than 2%.

The user can easily make a comparison between levels of gradation on which he or she wants to focus attention, when the white point adjustment is performed by the use of the color adjustment system for the display device. In other words, the present invention provides the printed material which makes easier the white point adjustment by the use of the color adjustment system for the display device.

A fifth aspect of the present invention is intended for a printed material with an image printed thereon, the printed material being for use in making a white point adjustment to a display device. The printed material is folded in two leaves. The image is printed on the inside surface of one of the two leaves, and the image is not printed on the inside surface of the other leaf.

This minimizes the influence of transfer of ink under the influence of moisture and temperature changes during storage, and the degradation of and smudges on the image printed surface during storage. Further, the surface on which printing is not done may be provided as a bottom surface when in use to thereby function as a reflecting plate. Furthermore, the components of the printed material are produced easily at low costs.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a view showing the construction of a color adjustment system for a display device according to the present invention;

FIG. 3 is a view showing a photo image to be printed on the printed material;

FIGS. 9 to 15 are views of display screens for illustrating the operation of the color adjustment system for the display device according to the present invention.

DESCRIPTION OF THE PREFERRED EMBODIMENTS

Figure 2:
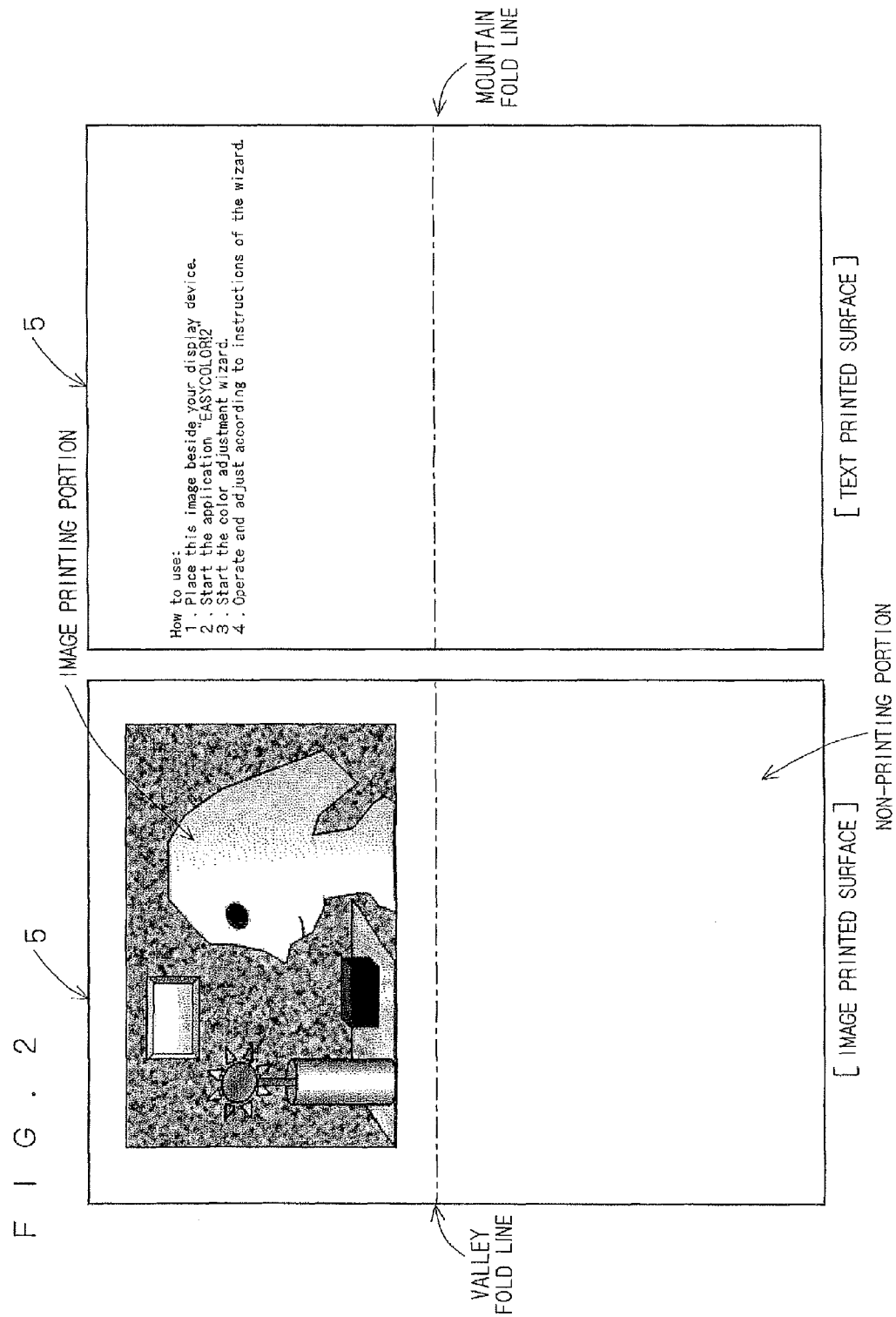
FIG. 2 is a view showing the layout of a printed material.

In a color adjustment system for a display device according to the present invention, photographic data obtained by photographing a real object or image data about computer graphics and the like from which a real object can be imagined is displayed on the display device, and is additionally printed as a printed material. Under a visual environment of a user, the display device and the printed material are placed in juxtaposition and compared with each other.

Additionally, a computer device reads the gain values of the RGB primary colors of preset data about a plurality of white points which are previously factory-configured for the display device. Then, a menu from which a user can select candidate values of the color temperature of illumination is displayed on the display device. Under the visual environment as mentioned above, the user compares the printed material and a display screen of the display device placed in juxtaposition with each other with the eye, and selects one candidate value of the color temperature judged to be closer to the color temperature on the printed material from the above-mentioned menu. Then, in accordance with the color temperature of a light source selected by the user, the computer device makes a correction of a fixed amount to the gain values of the above-mentioned RGB primary colors. Then, the computer device sends and sets the RGB gain values subjected to the above-mentioned correction to the display device by the use of a two-way communication capability between the computer device and the display device.

Additionally, a brightness adjustment menu is displayed on the display device, and a menu for causing the user to select a judgment as to whether the result of the setting is good or not is displayed on the display device. If the user judges that the result of the setting is not good, a more advanced color adjustment is made.

For the more advanced color adjustment, a chromaticity diagram indicating a color which becomes a target of white point change is displayed on the display device, and the adjustment of the white point on the display device under visual inspection is selected by the use of a pointing device such as a mouse. Then, the computer device obtains the correction values of the RGB gains from the chromaticity selected as mentioned above by the use of the values of the RGB primary color points, color preset values, and the gamma characteristic of the display device. Then, the computer device makes a correction of a fixed amount to the gain values of the above-mentioned RGB primary colors in accordance with the correction values. Then, the computer device sends and sets the RGB gain values subjected to the above-mentioned correction to the display device by the use of the two-way communication capability between the computer device and the display device. In addition, the computer device causes a brightness adjustment means to appear on the display device, and sends and sets a brightness setting value to the display device by the use of a two-way communication means between the computer device and the display device in accordance with the result of brightness setting by the user.

The present invention will now be described specifically based on the drawings showing a preferred embodiment thereof.

Preferred Embodiment

FIG. 1 is a view showing the overall construction of a color adjustment system 100 for a display device according to the preferred embodiment of the present invention. The color adjustment system 100 for the display device adjusts a light emission balance of the maximum output values of the RGB primary colors corresponding to the maximum values of RGB data, respectively, to make a white point adjustment.

With reference to FIG. 1, input devices such as a mouse 2, a keyboard 3 and the like, and a display device 4 are connected to a computer device 1. It should be noted that a printed material 5 is disposed in a substantially adjacent side-by-side relationship to the display device 4. In other words, the printed material 5 and an image appearing on the display device 4 are visible at a glance under the same illuminating device provided on the ceiling and the like.

FIG. 2 is a view showing the specifications of the printed material 5.

With reference to FIGS. 1 and 2, a single sheet of paper is folded into two leaves substantially perpendicular to each other so that an image printed surface of the sheet faces inward. An image is printed on only the inside surface of one of the two leaves (an image printing portion). Printing is not done on the inside surface of the other leaf (a non-printing portion) which is left blank. In other words, with the printed material 5 folded in two leaves substantially perpendicular to each other, the image printing portion and the non-printing portion are in a face-to-face relationship (are opposed) to each other at an angle of 90 degrees. The designations of articles, precautions for use, and the like are printed on the surface opposite from the printed surface (a text printed surface).

FIG. 3 is a view showing a photo image (or a computer graphics image). As may be seen in FIG. 1, an image is printed on the printed material 5, based on image data produced from the photo image, and the image is displayed on the display device 4. The photo image is used for color comparison. In the photo image, the reference numeral 51 designates an image portion including a portion (a white portion) of white color or of a color close to white, and a shadow portion of an achromatic color continuously changing from white to black. The reference numeral 52 designates a black portion, and the reference numeral 53 designates a gray portion (background).

It is desirable that the percentage of the reference numeral 51 in the entire photo image (i.e., the percentage of the white portion and the shadow portion in the entire photo) is greater than 10%. Also, it is desirable that the percentage of the reference numeral 53 in the entire photo image is greater than 30%. Also, it is desirable that the percentage of the reference numeral 52 in the entire photo image is greater than 2%.

It is preferable that the printed material 5 is a paper sheet for use in ink jet printers or a paper sheet of a color close to the color of an average paper sheet for ink jet printers.

Figure 4:
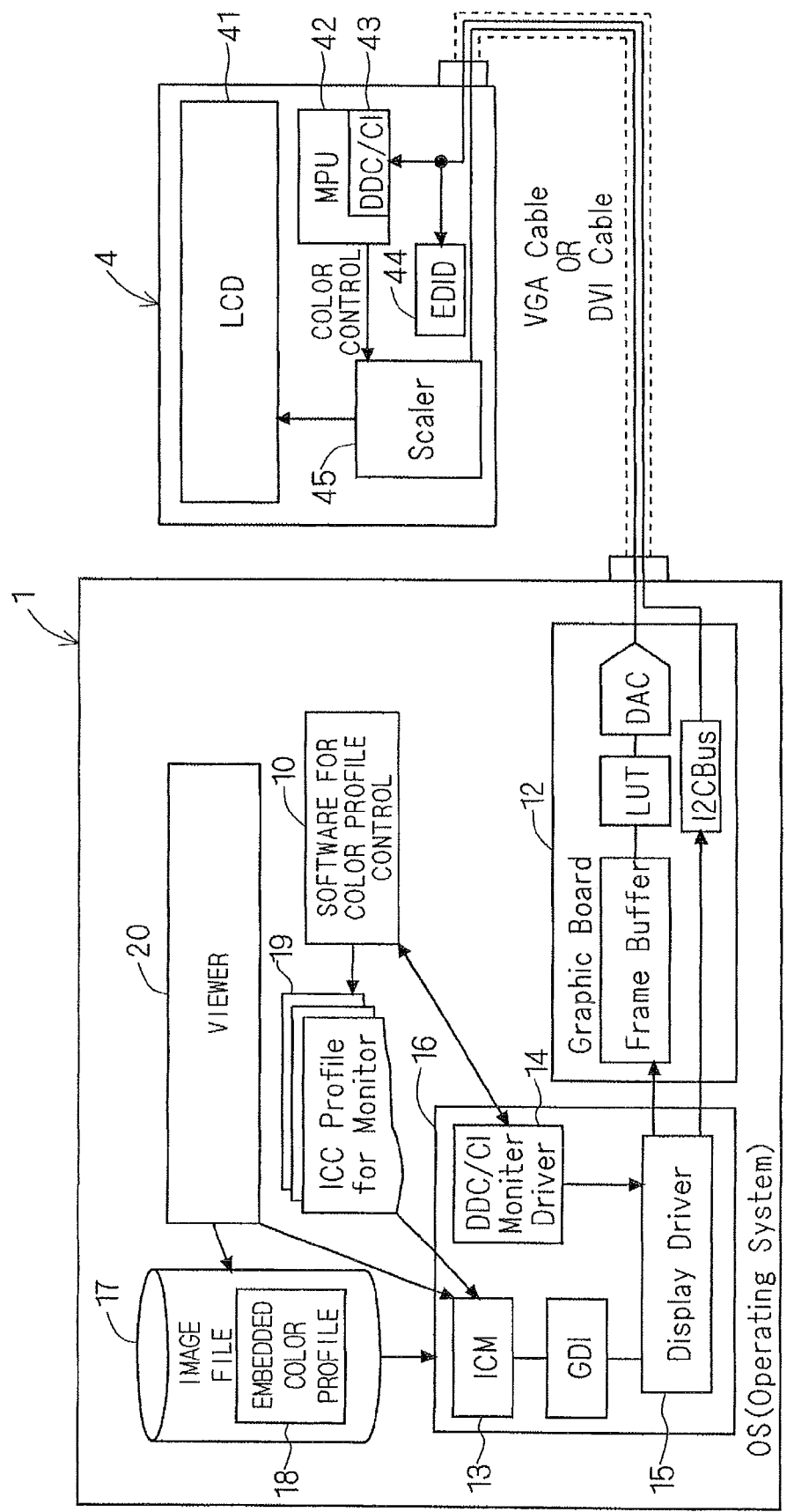
FIG. 4 is a block diagram showing the internal functional construction of a computer device and the internal functional construction of a display device.

FIG. 4 is a block diagram showing the functional construction of the computer device 1 and the functional construction of the display device 4.

In FIG. 4, the reference numeral 10 designates software for color profile control which is installed in the computer device 1. The reference numeral 12 designates a graphics accelerator device having a two-way communication capability between the computer device 1 and the display device 4. The reference numeral 13 designates a color management engine incorporated in an operating system (OS) installed in the computer device 1. The reference numeral 14 designates a driver incorporated in the OS and for allowing two-way communications between the display device 4 and the computer device 1. The reference numeral 15 designates a display driver. The reference numeral 16 designates the OS including the blocks 13 to 15. The reference numeral 17 designates an image file stored in the computer device 1. The reference numeral 18 designates a color profile embedded in the image file 17. The reference numeral 19 designates a color profile corresponding to the display device 4 and conditions of color settings such as color temperature color presets of the display device 4. The reference numeral 20 designates color adjustment software serving also as a viewer for displaying image data.

In FIG. 4, the reference numeral 41 designates a liquid crystal panel. The reference numeral 42 designates a microcomputer. The microcomputer 42 has a two-way communication means 43. The reference numeral 44 designates EDID (Extended Display Identification Data) including color information inherent in the display device. The EDID 44 is standardized by VESA (Video Electronics Standards Association) in the USA, and is incorporated in almost all display devices at the present time. The EDID 44 includes RGB primary colors, factory-configured white color chromaticity data, and gamma values. The reference numeral 45 designates a scaler IC (Integrated Circuit) for drawing. The scaler IC 45 incorporates the capability of color adjustment, a gamma correction table (LUT: Look Up Table), and the like.

As shown in FIG. 4, the computer device 1 and the display device 4 are connected to each other through a VGA (Video Graphics Array) cable or a DVI (Digital Visual Interface) cable.

Next, description will be give on the operation of the color adjustment system 100 for the display device according to this preferred embodiment with reference to the flow diagrams shown in FIGS. 5, 6, 7 and 8. In the operation of adjusting the white point according to this preferred embodiment, the image on the printed material 5 and the image displayed on the display device 4 are disposed so that a comparison can be made therebetween. This enables the user to select a color temperature color preset under visual inspection.

Figure 5:
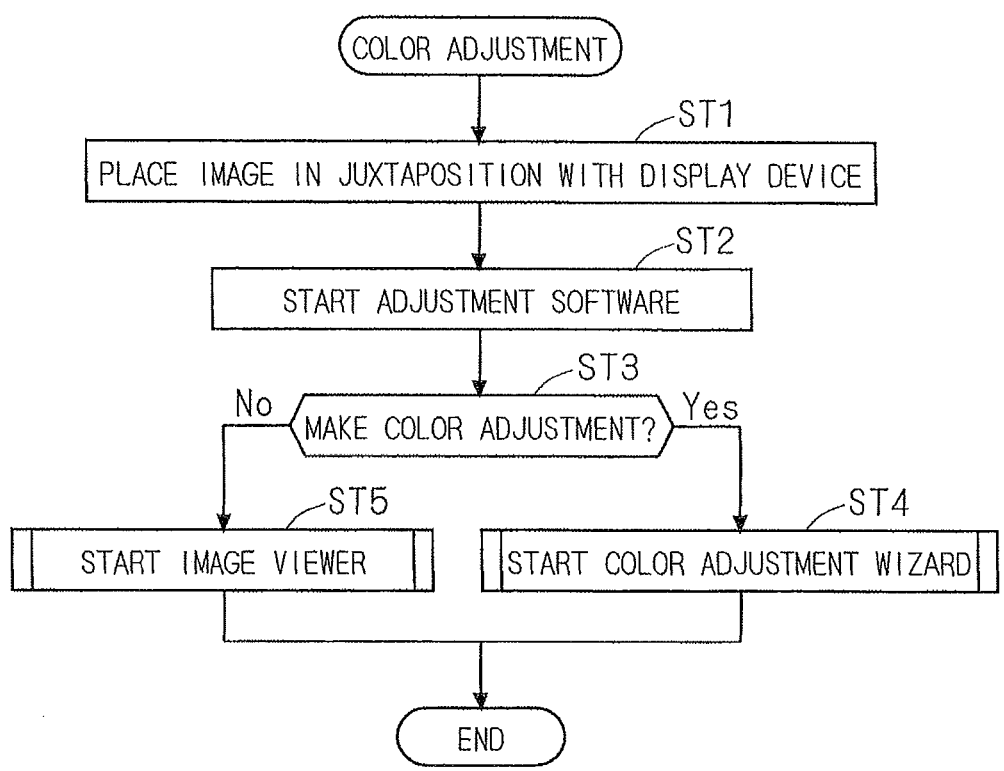
FIGS. 5 to 8 are flow diagrams for illustrating the operation of the color adjustment system for the display device according to the present invention.
Figure 6:
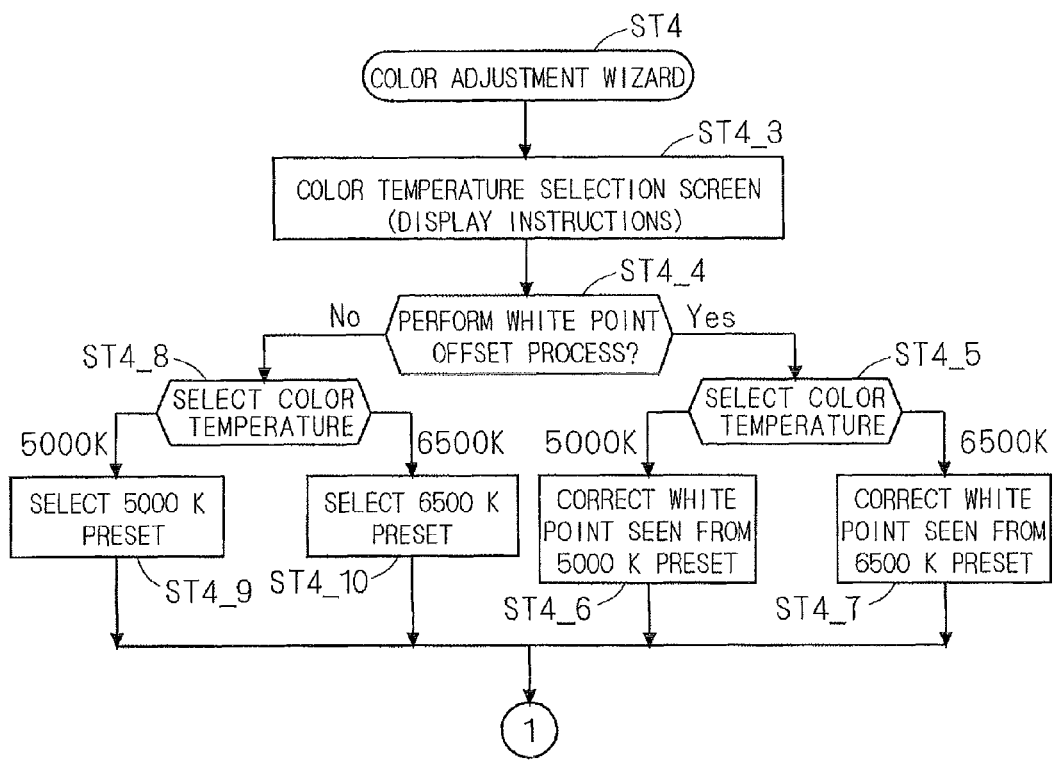
Figure 7:
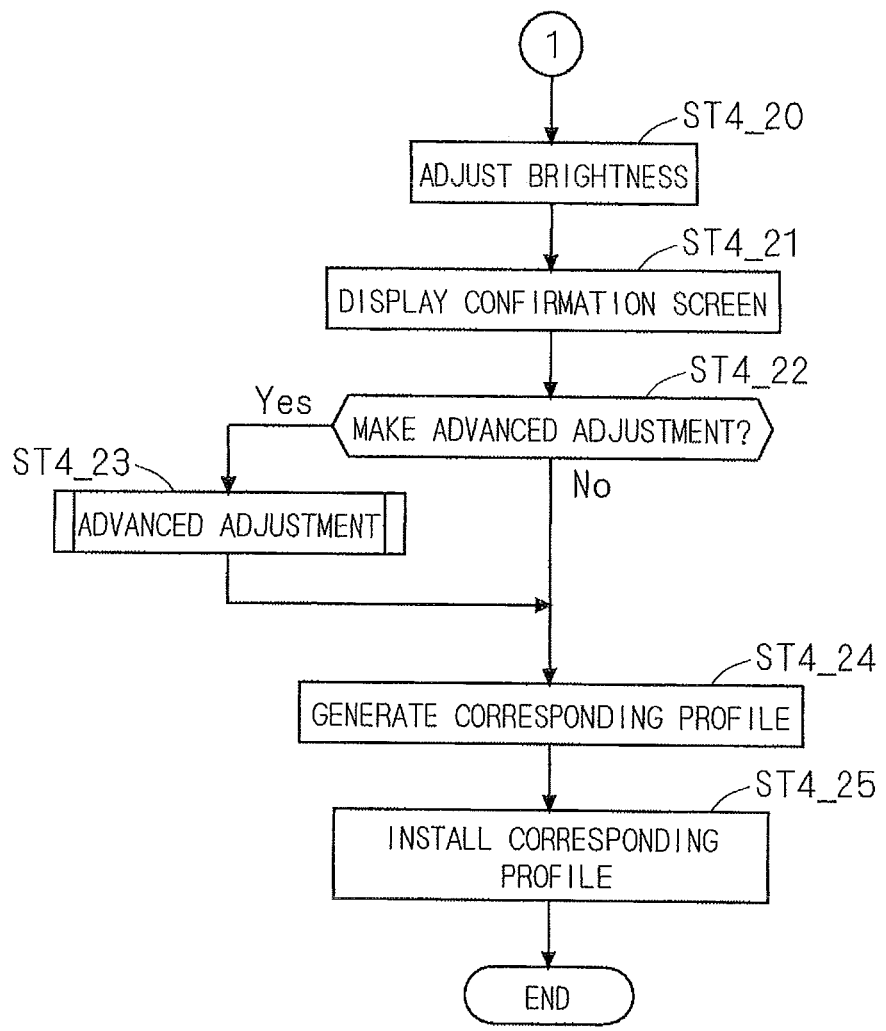
Figure 8:
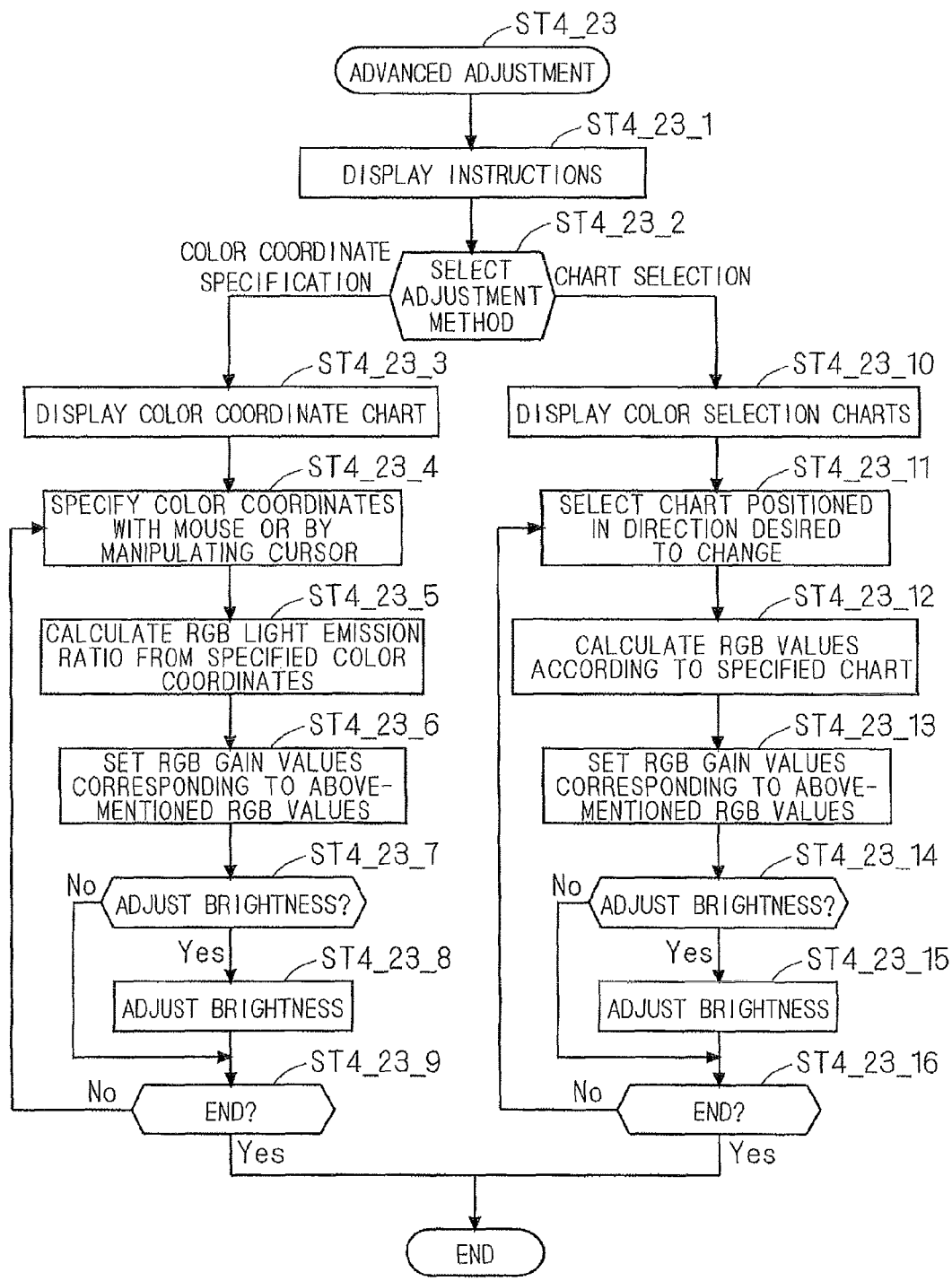

FIG. 5 is a flow diagram showing a method of starting the operation and the like. FIGS. 6 and 7 are flow diagrams showing a detailed procedure for a color adjustment wizard. FIG. 8 is a flow diagram showing a procedure for an advanced white point adjustment process. Operations of a screen displayed on the display device 4 are performed by the use of the mouse 2 and the keyboard 3 which are connected to the computer device 1.

First, the flow diagram shown in FIG. 5 will be described.

The printed material 5 with an image printed thereon is placed in juxtaposition with the display device 4 with the image displayed thereon (in Step ST1). Next, color adjustment software having a viewer function is started (in Step ST2). Next, a selection is made as to whether to make a color adjustment or not (in Step ST3). When the color adjustment is to be made ("Yes" in Step ST3), the color adjustment wizard is started (in Step ST4). On the other hand, when the color adjustment is not to be made ("No" in Step ST3), an image viewer is started (in Step ST5).

Next, the operation of the color adjustment wizard (in Step ST4) will be described specifically with reference to FIGS. 6 and 7.

Figure 9:
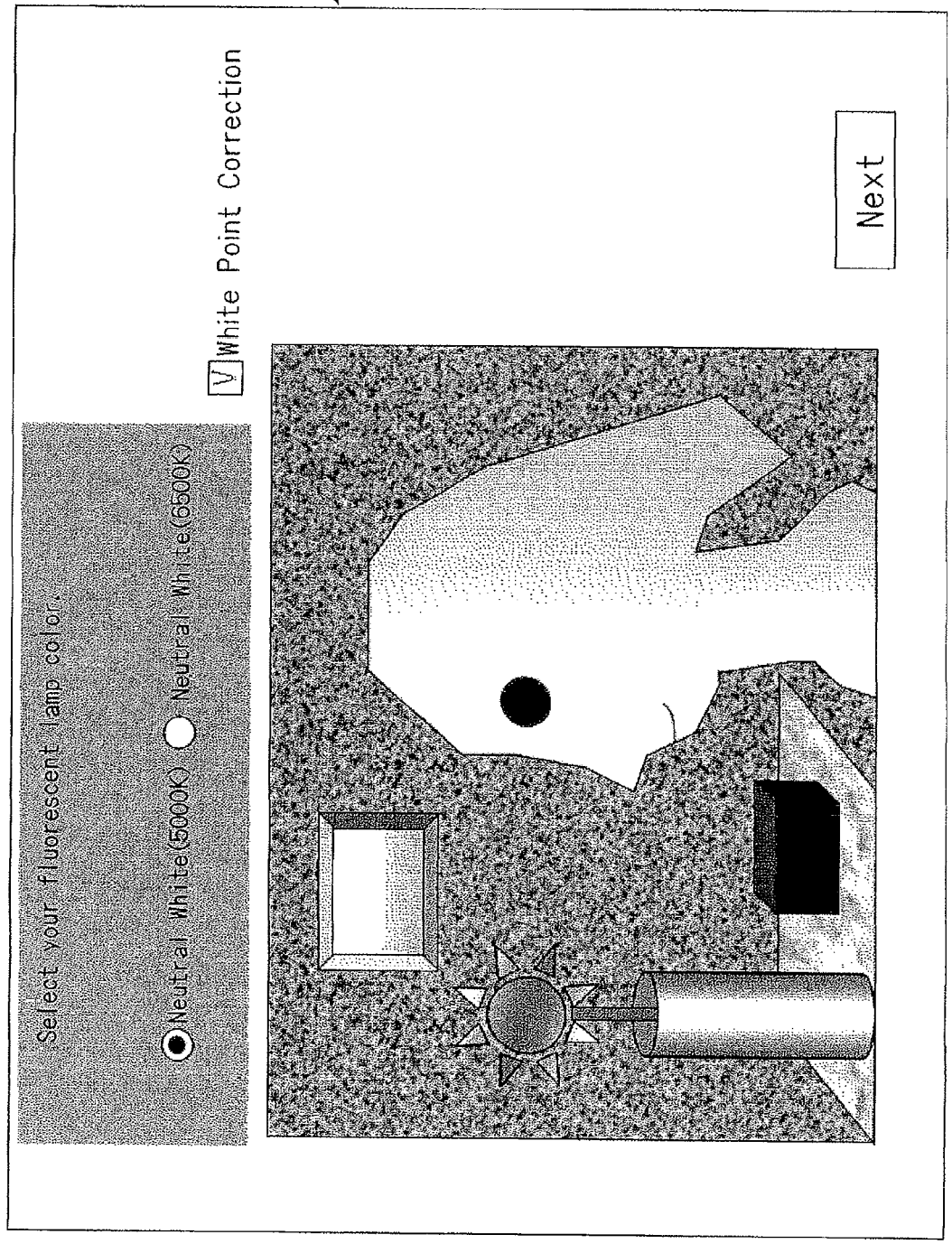

When the color adjustment wizard is started, a color temperature selection screen (a color temperature color preset selection screen) and instructions are displayed on the display device 4 (in Step ST4_3), as shown in FIG. 9. Whether to perform a white point offset process or not is determined by whether a checkmark is placed in the checkbox of "White Point Correction" in the screen shown in FIG. 9 or not (in Step ST4_4).

A plurality of color temperature color presets are previously factory-adjusted and preset to the display device 4.

When the execution of the white point offset process is selected ("Yes" in Step ST4_4), a color temperature selection (selection of any one of "Neutral White (5000 K)" and "Neutral White (6500 K)") is made on the screen shown in FIG. 9 (in Step ST4_5). In accordance with the result of the selection in Step ST4_5, the computer device 1 reads out RGB gain data corresponding to the color temperature color presets set to the display device 4 by the use of the communication function, makes a fixed correction to the read RGB gain data, and thereafter sends and sets the RGB gain data subjected to the correction to the display device 4 by the use of the communication function (in Steps ST4_6 and ST4_7). For a color temperature color preset value of 5000 K, for example, the correction value in this case is a gain value corresponding to 5500 K that is 500 K higher.

On the other hand, when the white point offset process is not to be performed ("No" in Step ST4_4), only the operation of selecting a color temperature color preset of the display device 4 is performed (in Steps ST4_9 and ST4_10).

Next, with reference to the flow diagram of FIG. 7, a brightness adjustment screen is displayed on the display device 4, and the user adjusts the brightness by performing an operation on the brightness adjustment screen (in Step ST4_20). FIG. 10 shows an example of the brightness adjustment screen. The backlight brightness setting of the display device 4 is performed by moving the position of a slider bar displayed on the brightness adjustment screen. Then, the user compares the image displayed on the display device 4 and the printed material 5 placed in juxtaposition with the display device 4 with each other with the eye to perform the brightness adjustment process so as to feel the brightnesses of the two to be as high as each other. Also, the brightness data in accordance with the set position of the slider bar is sent from the computer device 1 to the display device 4 through a communication means.

Figure 11:
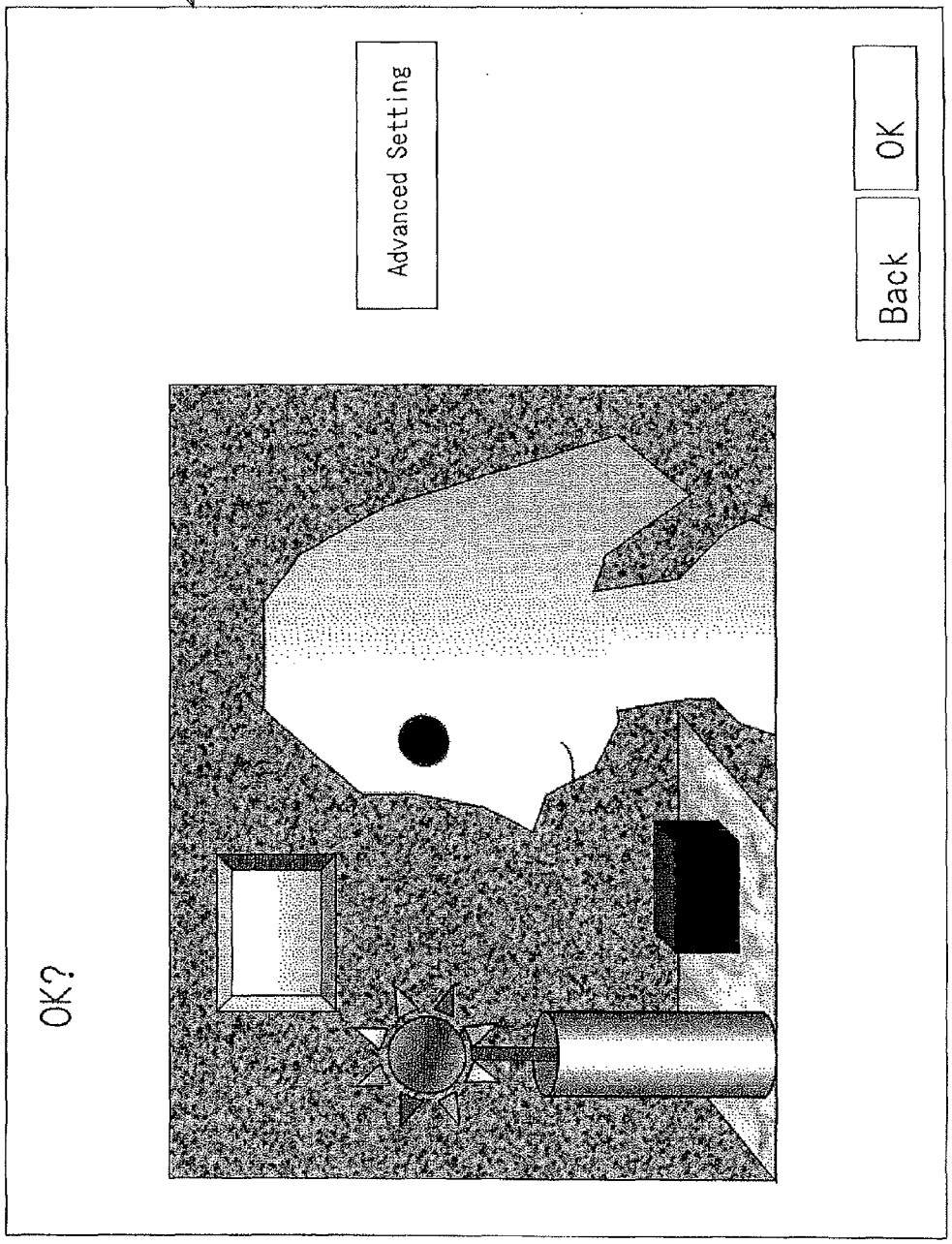

Next, as shown in FIG. 11, a confirmation screen is displayed on the display device 4 (in Step ST4_21). At this time, the user clicks an OK displayed on the confirmation screen ("No" in Step ST4_22). Then, the adjustment operation is completed, and a color profile is generated based on the white point corresponding to the set color temperature color preset or determined by the RGB primary color points and the RGB gain values (in Step ST4_24).

The color profile includes descriptions about XYZ chromaticity coordinates of each of the white point and RGB primary color points, and the gamma values (table) of RGB. The XYZ chromaticity coordinates of each of the RGB primary color points used herein are those described in the above-mentioned EDID 44 and read therefrom.

Next, the generated color profile is installed into a management folder of the OS 16 (in Step ST4_25). Prior to the installation, a comparison is made between the white point and the gamma value of the existing profile in the management folder and the white point and the gamma value of the generated new profile. When these values are within given allowance limits of error, the existing profile is specified as a "default color profile" for the OS 16, and is defined so as to be used as the color profile associated with the display device 4 in the viewer and the like.

Returning to Step ST4_22, it is assumed that the execution of an advanced adjustment is selected ("Yes" in Step ST4_22). In other words, it is assumed that an "Advanced Setting" button displayed on the screen shown in FIG. 11 is clicked with the mouse. In this case, the procedure proceeds to Step ST4_23, in which the operation (the advanced white point adjustment process) shown in FIG. 8 is performed.

With reference to FIG. 8, an instruction display screen (showing a method of specifying the white point) is first displayed on the display device 4 (in Step ST4_23_1), as shown in FIG. 12. A menu showing "Adjust on the chromaticity diagram" and "Specify by selecting an image" is displayed on this instruction display screen, and radio buttons for selection are further displayed thereon.

Figure 13:
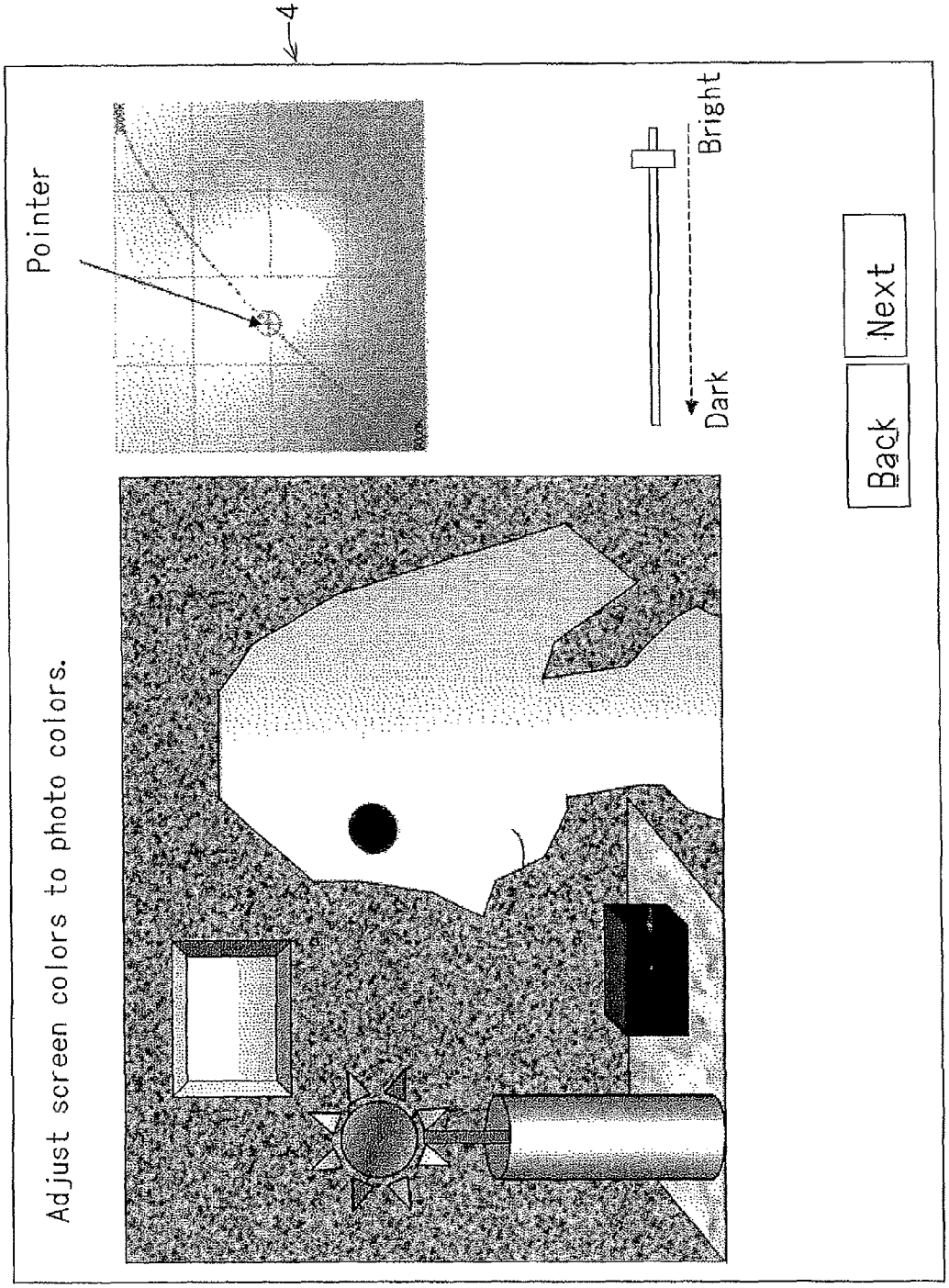

The user makes a selection between the color adjustment methods on the instruction display screen (in Step ST4_23_2). It is assumed that the user selects "Adjust on the chromaticity diagram." In this case, the procedure proceeds to Step ST4_23_3, in which a white point adjustment screen as shown in FIG. 13 is displayed on the display device 4. The white point adjustment screen shown in FIG. 13 includes a chromaticity diagram such as CIE-xy and CIE-uv chromaticity diagrams. The user moves a pointer displayed on the chromaticity diagram with the mouse or by manipulating a cursor key, and specifies (determines) the color coordinates of the white point and the color coordinates of the RGB primary color points by a confirmation operation such as the operation of clicking or the operation of pressing a return key (in Step ST4_23_4).

Next, the computer device 1 calculates an RGB light emission ratio of the RGB primary color points from the color coordinates of the specified white point and the color coordinates of the ROB primary color points (in Step ST4_23_5). Next, the computer device 1 calculates the RGB gain values from the above-mentioned RGB light emission ratio, and sends the RGB gain values to the display device 4 by way of a communication means between the computer device 1 and the display device 4 for the purpose of setting the RGB gain values in the display device 4 (in Step ST4_23_6).

For the color matching between the screen of the display device 4 and the printed material 5, it is important to make the brightnesses of the two equal to each other. To this end, the user uses a slider bar shown in FIG. 13, as required, to specify a brightness set value, and a communication means similar to that described above is used to change the backlight brightness setting in the display device 4 (in Steps ST4_23_7 and ST4_23_8).

As may be seen from the procedure in Step ST4_23_9, the user repeatedly performs the processes in Steps ST4_23_4 to ST4_23_8 until he or she feels the colors and brightnesses on the screen of the display device 4 and the printed material 5 to be approximately the same. When the user judges that the colors and the brightnesses are the same, the advanced white point adjustment process is completed.

Returning to Step ST4_23_2, it is assumed that the user selects "Specify by selecting an image" in Step ST4_23_2. In this case, the procedure proceeds to Step ST4_23_10, in which a white point adjustment screen as shown in FIG. 14 is displayed on the display device 4. As shown in FIG. 14, the white point adjustment screen includes a total of nine charts of different sizes, and a slider bar for brightness adjustment.

The above-mentioned nine charts include one large image having a size close to the size of the image printed on the printed material 5, and eight small images (which may be grasped as selectable images) disposed around the large image and having respective white points shifted from each other.

The small images arranged in a vertical direction in the screen of the display device 4 shown in FIG. 14 have respective gains of G (green) among the RGB primary colors which are changed in steps of a fixed amount relative to that of the large image. The small images have respective white points shifted so that G (green) is intensified in an upward direction from the bottom images.

Further, the small images arranged in a horizontal direction in the screen of the display device 4 shown in FIG. 14 have respective gains of R (red) and B (blue) among the RGB primary colors which are changed in steps of a fixed amount relative to those of the large image. The small images have respective white points shifted so that R (red) is intensified in a rightward direction from the left-hand images. Also, the small images have respective white points shifted so that B (blue) is intensified in a leftward direction from the right-hand images.

The user makes a comparison between the large image and the image on the printed material 5 with each other to select and specify one small image from among the eight small images so that the color is changed to an intended color by the use the mouse and the like on the computer device side (in Step ST4_23_11).

Next, the computer device 1 increases or decreases (calculates) the existing RGB gain set values, based on the RGB gain increase or decrease of the specified small image (in Step ST4_23_12). Thereafter, the computer device 1 sends the calculated gain values to the display device 4 by way of a communication means between the computer device 1 and the display device 4 for the purpose of setting the calculated gain values in the display device 4 (in Step ST4_23_13).

For the color matching between the screen of the display device 4 and the printed material 5, it is important to make the brightnesses of the two equal to each other. To this end, the user uses a slider bar shown in FIG. 14, as required, to specify the brightness set value, and a communication means similar to that described above is used to change the backlight brightness setting in the display device 4 (in Steps ST4_23_14 and ST4_23_15).

As may be seen from the procedure in Step ST4_23_16, the user repeatedly performs the processes in Steps ST4_23_11 to ST4_23_15 until he or she feels the colors and brightnesses on the screen of the display device 4 and the printed material 5 to be approximately the same. When the user judges that the colors and the brightnesses are the same, the advanced white point adjustment process is completed.

Finally, a white point adjustment (change) result confirmation screen is displayed on the display device 4, as shown in FIG. 15. The user selects a "Back" button or an "OK" button displayed on the white point adjustment (change) result confirmation screen shown in FIG. 15. When the "Back" button is selected, the procedure returns to Step ST4_23_1.

In the color adjustment system 100 for the display device according to the present invention, photographic data obtained by photographing a real object or image data about computer graphics and the like from which a real object can be imagined is displayed on the display device 4 and is additionally printed as the printed material 5. Under the visual environment such as illumination and the like of the user, the display device 4 and the printed material 5 are placed in juxtaposition with each other so that a comparison can be made therebetween.

This enables the user who is not an expert in color science to make the color adjustment (the white point adjustment) just like performing color matching for photographs that he or she usually treats under an actual work environment; thereby accomplishing the easy and convenient white point adjustment with predetermined accuracy.

Also, in the color adjustment system 100 for the display device according to the present invention, the user can make a comparison between the printed material 5 and the screen of the display device 4 disposed in juxtaposition with the eye under the above-mentioned visual environment to select a color temperature color preset judged to be closer to that on the printed material 5 from among the plurality of color temperature color presets.

This allows the white point of the display device 4 to be closer to the white point of paper in a simple way without undergoing a complicated white point adjustment process.

Also, the color adjustment system 100 for the display device according to the present invention corrects the amount of error between the calorimetric value obtained by the color matching function such as defined by CIE 1931 and the like for use in measuring instruments and the like and the color actually observed and perceived by the eye of the user to adjust the white color displayed on the display device 4, based on the spectral emissivity characteristics of the display device 4 during white color display and the spectral characteristics of light reflected from paper which are determined in association with the spectral reflectance of the printed material 5 disposed in juxtaposition with the display device 4 and the spectral emissivity of an illumination light source. This allows the white point of the printed material 5 and the white point of the display device 4 to be closer to each other with accuracy.

For the adjustment of the white point of the display device 4 under visual inspection in the color adjustment system 100 for the display device according to the present invention, the color that becomes the target of the white point change is on the chromaticity diagram by the use of the pointing device such as the mouse and the like. This allows the white point adjustment of the display device 4 more intuitively and easily.

For the adjustment of the white point of the display device 4 under visual inspection in the color adjustment system 100 for the display device according to the present invention, the nine images (including the one large image and the eight small images) subjected to changes which become the target of the white point change are displayed. The eight small images having RGB primary color constituent ratios varied in steps of the fixed amount with reference to the white point of the single large image are disposed around the large image. The white point of the large image is changed by specifying a small image having a desired white point by the use of the pointing device such as the mouse and the like. This accomplishes the white point adjustment of the display device 4.

Further, the image including at least the white portion 51 of white color or of a color close to white, the shadow portion 51 of an achromatic color continuously changing from white to black, the gray portion 53, and the black portion 52 is printed on the printed material 5 according to the present invention. The percentage of the white portion 51 and the shadow portion 51 in the entire image is greater than 10%. The percentage of the gray portion 53 in the entire image is greater than 30%. The percentage of the black portion 52 in the entire image is greater than 2%.

Thus, the user can easily make a comparison between levels of gradation on which he or she wants to focus attention, when the white point adjustment is performed by the use of the color adjustment system 100 for the display device. In other words, the present invention provides the printed material 5 which makes easier the white point adjustment by the use of the color adjustment system 100 for the display device.

Also, the printed material 5 is stored and transported while being folded in two leaves. As shown in FIGS. 1 and 2, printing is done only on the inside surface of one of the two leaves, and printing is not done on the inside surface of the other leaf.

This minimizes the influence of transfer of ink under the influence of moisture and temperature changes during storage, and the degradation of and smudges on the image printed surface during storage. Further, the surface on which printing is not done may be provided as a bottom surface when in use to thereby function as a reflecting plate. Furthermore, the components of the printed material 5 are produced easily at low costs.

The paper sheet for the printed material 5 used herein is a printed material for use in ink jet printers or a paper sheet of a color close to the color of an average paper sheet for ink jet printers. This enables the white point of the display device 4 subjected to the white point adjustment by the use of the color adjustment system 100 for the display device to be closer to the white color of an ink jet printer possessed by the user, thereby achieving the color matching with higher accuracy.

The color adjustment system 100 for the display device according to the present invention is applicable to a color adjustment system for a display device connected to a computer device for use at home. In determining the adjustment target point of a color adjustment device using a calorimeter and the like, the color adjustment system 100 for the display device according to the present invention is also applicable to the adjustment of some display devices for industrial use.

While the invention has been described in detail, the foregoing description is in all aspects illustrative and not restrictive. It is understood that numerous other modifications and variations can be devised without departing from the scope of the invention.

What is claimed is:

1. A color adjustment system for a display device, comprising:
   a computer device; and
   a display device for displaying an image,
   said display device selectably displaying a plurality of color temperature color presets,
   said computer device making a color adjustment to said display device, based on a color temperature color preset selected from among said plurality of color temperature color presets by a selecting operation from said computer device,
   said computer device generating a color profile based on a white point corresponding to the selected color temperature color preset or determined by the RGB primary color points and the RGB gain values,
   a user that compares a printed material and a screen of the display device to select a color temperature color preset judged to be closer to that on the printed material from among the plurality of color temperature color presets, and
   said printed material, with an image printed thereon, being used in making a white point adjustment to the display device,
   said image including at least:
   a white portion;
   a shadow portion of an achromatic color continuously changing from white to black;
   a black portion; and
   a gray portion,
   wherein the percentage of said white portion and said shadow portion in said image is greater than 10%,
   wherein the percentage of said gray portion in said image is greater than 30%, and
   wherein the percentage of said black portion in said image is greater than 2%,
   wherein the color adjustment system is further configured to install said generated color profile into a management folder, and prior to the installation, a comparison is made between the white point and a gamma value of existing profile in the management folder and the white point and the gamma value of the generated color profile, and based on a determination that these values are within a predetermined limit, the existing profile is specified as a default color profile so as to be used as the color profile associated with the display device.

2. The color adjustment system for a display device according to claim 1,
   wherein said computer device corrects RGB gain data, based on said selected color temperature color preset, to make the color adjustment to said display device by using the RGB gain data subjected to the correction.

3. A color adjustment system for a display device, comprising:
   a computer device; and
   a display device for displaying an image,
   said display device displaying a chromaticity diagram,
   said computer device making a color adjustment to said display device in accordance with an operation performed on said chromaticity diagram from said computer device
   a user specifies on the chromaticity diagram, color coordinates of a white point and color coordinates of RGB color points by a confirmation operation, and
   a printed material with an image printed thereon, said printed material being used in making a white point adjustment to the display device,
   said image including at least:
   a white portion;
   a shadow portion of an achromatic color continuously changing from white to black;
   a black portion; and
   a gray portion,
   wherein the percentage of said white portion and said shadow portion in said image is greater than 10%,
   wherein the percentage of said gray portion in said image is greater than 30%, and
   wherein the percentage of said black portion in said image is greater than 2%,
   wherein the color adjustment system is further configured to install a color profile generated by said computer device into a management folder, and prior to the installation, a comparison is made between the white point and a gamma value of existing profile in the management folder and the white point and the gamma value of the generated color profile, and based on a determination that these values are within a predetermined limit, the existing profile is specified as a default color profile so as to be used as the color profile associated with the display device.

4. A color adjustment system for a display device, comprising:
   a computer device; and
   a display device for displaying an image,
   said display device selectably displaying a plurality of selectable images having respective RGB gain values different from each other, said computer device making a color adjustment to said display device, based on a selectable image selected from among said plurality of selectable images by a selecting operation from said computer device said computer device generating a color profile based on a white point corresponding to the selected color temperature color preset or determined by the RGB primary color points and the RGB gain values, and a user that compares a printed material and a screen of the display device to select a color temperature color preset judged to be closer to that on the printed material from among the plurality of color temperature color presets, and said printed material, with an image printed thereon, being used in making a white point adjustment to the display device, said image including at least:

a white portion;

a shadow portion of an achromatic color continuously changing from white to black;

a black portion; and a gray portion, wherein the percentage of said white portion and said shadow portion in said image is greater than 10%, wherein the percentage of said gray portion in said image is greater than 30%, and wherein the percentage of said black portion in said image is greater than 2%, wherein the color adjustment system is further configured to install said generated color profile into a management folder, and prior to the installation, a comparison is made between the white point and a gamma value of existing profile in the management folder and the white point and the gamma value of the generated color profile, and based on a determination that these values are within a predetermined limit, the existing profile is specified as a default color profile so as to be used as the color profile associated with the display device.

5. The color adjustment system for a display device according to claim 1, wherein said display device displays a brightness adjustment screen which is used in changing the setting of a brightness value of said display device, and wherein said computer device sets the brightness value of said display device, based on brightness value information determined by a selecting operation performed on said brightness adjustment screen from said computer device.

6. The color adjustment system for a display device according to claim 2, wherein said display device displays a brightness adjustment screen which is used in changing the setting of a brightness value of said display device, and wherein said computer device sets the brightness value of said display device, based on brightness value information determined by a selecting operation performed on said brightness adjustment screen from said computer device.

7. The color adjustment system for a display device according to claim 3, wherein said display device displays a brightness adjustment screen which is used in changing the setting of a brightness value of said display device, and wherein said computer device sets the brightness value of said display device, based on brightness value information determined by a selecting operation performed on said brightness adjustment screen from said computer device.

8. The color adjustment system for a display device according to claim 4, wherein said display device displays a brightness adjustment screen which is used in changing the setting of a brightness value of said display device, and wherein said computer device sets the brightness value of said display device, based on brightness value information determined by a selecting operation performed on said brightness adjustment screen from said computer device.

9. A color adjustment system for a display device, comprising:

a computer device; and a display device for displaying an image, said display device selectably displaying a plurality of color temperature color presets, said computer device making a color adjustment to said display device, based on a color temperature color preset selected from among said plurality of color temperature color presets by a selecting operation from said computer device, said computer device generating a color profile based on a white point corresponding to the selected color temperature color preset or determined by the RGB primary color points and the RGB gain values, and a user that compares a printed material and a screen of the display device to select a color temperature color preset judged to be closer to that on the printed material from among the plurality of color temperature color presets, and said printed material, with an image printed thereon, being used in making a white point adjustment to the display device, said printed material being folded in two leaves, wherein said image is printed on the inside surface of one of the two leaves, and wherein said image is not printed on the inside surface of the other leaf, wherein the surface on which said image is not printed is provided as a bottom surface when in use to thereby function as a reflecting plate, wherein the color adjustment system is further configured to install said generated color profile into a management folder, and prior to the installation, a comparison is made between the white point and a gamma value of existing profile in the management folder and the white point and the gamma value of the generated color profile, and based on a determination that these values are within a predetermined limit, the existing profile is specified as a default color profile so as to be used as the color profile associated with the display device.

10. A color adjustment system for a display device, comprising:

a computer device; and a display device for displaying an image, said display device displaying a chromaticity diagram, said computer device making a color adjustment to said display device in accordance with an operation performed on said chromaticity diagram from said computer device a user specifies on the chromaticity diagram, color coordinates of a white point and color coordinates of RGB color points by a confirmation operation, and a printed material with an image printed thereon, said printed material being used in making a white point adjustment to the display device, said printed material being folded in two leaves, wherein said image is printed on the inside surface of one of the two leaves, and wherein said image is not printed on the inside surface of the other leaf, wherein the surface on which said image is not printed is provided as a bottom surface when in use to thereby function as a reflecting plate, wherein the color adjustment system is further configured to install a color profile generated by said computer device into a management folder, and prior to the installation, a comparison is made between the white point and a gamma value of existing profile in the management folder and the white point and the gamma value of the generated color profile, and based on a determination that these values are within a predetermined limit, the existing profile is specified as a default color profile so as to be used as the color profile associated with the display device.

11. A color adjustment system for a display device, comprising:

a computer device; and a display device for displaying an image, said display device selectably displaying a plurality of selectable images having respective RGB gain values different from each other, said computer device making a color adjustment to said display device, based on a selectable image selected from among said plurality of selectable images by a selecting operation from said computer device said computer device generating a color profile based on a white point corresponding to the selected color temperature color preset or determined by the RGB primary color points and the RGB gain values, and a user that compares a printed material and a screen of the display device to select a color temperature color preset judged to be closer to that on the printed material from among the plurality of color temperature color presets, and said printed material, with an image printed thereon, being used in making a white point adjustment to the display device, said printed material being folded in two leaves, wherein said image is printed on the inside surface of one of the two leaves, and wherein said image is not printed on the inside surface of the other leaf, wherein the surface on which said image is not printed is provided as a bottom surface when in use to thereby function as a reflecting plate, wherein the color adjustment system is further configured to install said generated color profile into a management folder, and prior to the installation, a comparison is made between the white point and a gamma value of existing profile in the management folder and the white point and the gamma value of the generated color profile, and based on a determination that these values are within a predetermined limit, the existing profile is specified as a default color profile so as to be used as the color profile associated with the display device.

* * * * *